(12) United States Patent
Yalvac et al.

(10) Patent No.: US 6,552,110 B1
(45) Date of Patent: Apr. 22, 2003

(54) THERMOPLASTIC MARKING COMPOSITIONS

(75) Inventors: Selim Yalvac, Lake Jackson, TX (US); Teresa Karjala, Lake Jackson, TX (US); Robert A. Dubois, Houston, TX (US); Mark W. Murphy, Schoenenberg (CH); Stein Dietrichson, Fredrikstad (NO); Bjorn Nossen, Rade (NO); Ingvild J. B. Stene, Fredrikstad (NO)

(73) Assignees: Dow Global Technologies Inc., Midland, MI (US); Nor-Skilt, Moss (NO)

( * ) Notice: Subject to any disclaimer, the term of this patent is extended or adjusted under 35 U.S.C. 154(b) by 0 days.

(21) Appl. No.: 09/529,626

(22) PCT Filed: Oct. 19, 1998

(86) PCT No.: PCT/US98/22123

§ 371 (c)(1),
(2), (4) Date: Jun. 12, 2000

(87) PCT Pub. No.: WO99/20701

PCT Pub. Date: Apr. 29, 1999

Related U.S. Application Data (60) Provisional application No. 60/063,129, filed on Oct. 21, 1997, and provisional application No. 60/071,685, filed on Jan. 16, 1998.

(51) Int. Cl.$^7$ .............................................. C08L 93/04
(52) U.S. Cl. .................. 524/274; 524/425; 524/270; 524/494; 524/497; 524/413; 528/490; 523/172
(58) Field of Search ................................ 524/413, 425, 524/270, 494, 497; 528/490

(56) References Cited

U.S. PATENT DOCUMENTS

| | | | | |
|---|---|---|---|---|
| 3,935,158 A | * | 1/1976 | Watanabe | 260/42.21 |
| 4,284,541 A | * | 8/1981 | Takeda | 260/27 R |
| 4,613,632 A | * | 9/1986 | Aliani et al. | 523/172 |
| 4,690,958 A | * | 9/1987 | Lacoste et al. | 523/172 |
| 5,194,113 A | * | 3/1993 | Lasch et al. | 156/243 |
| 5,405,894 A | * | 4/1995 | Best | 524/166 |
| 5,536,569 A | * | 7/1996 | Lasch et al. | 428/328 |
| 5,548,014 A | * | 8/1996 | Tse et al. | 524/477 |
| 5,574,084 A | * | 11/1996 | Peacock | 524/270 |
| 6,111,027 A | * | 8/2000 | Wright et al. | 525/301 |
| 6,207,742 B1 | | 3/2001 | Boldt | 524/494 |

FOREIGN PATENT DOCUMENTS

| | | | | |
|---|---|---|---|---|
| EP | 0 056 771 A1 | * | 7/1982 | E01F/9/04 |
| EP | 155434 | * | 8/1984 | C09J/3/14 |
| EP | 0 271 254 A2 | * | 6/1988 | C09J/3/14 |
| EP | 0 115 434 | | 8/1994 | C09J/3/14 |
| GB | 1190746 | * | 5/1970 | C08F/29/02 |
| GB | 1 324 553 | | 7/1973 | C08F/39/00 |
| GB | 2 059 430 A | * | 4/1981 | C09D/5/00 |
| GB | 2 059 430 | | 4/1981 | C09D/5/00 |
| JP | 52-71533 | * | 6/1977 | E01F/9/08 |
| JP | 59-155479 | * | 9/1984 | C09J/7/00 |
| WO | 96/23845 | | 8/1996 | C09D/151/06 |
| WO | WO 97/33921 | * | 9/1997 | C08F/2/00 |
| WO | 97/33921 | | 9/1997 | C08F/2/00 |
| WO | WO 99/16845 A1 | * | 4/1999 | C09J/123/08 |

OTHER PUBLICATIONS

Derwent Chemical Abstract JP–52058737.
Derwent Chemical Abstract NL–7907550.

\* cited by examiner

*Primary Examiner*—David W. Wu
*Assistant Examiner*—Rip A Lee (57) ABSTRACT

The subject invention pertains to thermoplastic marking compositions comprising a binder, which in turn comprise at least one homogeneous polymer. Accordingly, the subject invention provides a thermoplastic marking composition comprising: (a) from 10 to 80 weight percent of a binder, which in turn comprises: (i) from 1 to 99 weight percent of at least one homogeneous polymer; (ii) from 5 to 70 weight percent of at least one tackifier; (iii) from 0 to 10 weight percent of a polyethylene which has pendant acid functionality moieties of a non-functionalized wax; and (iv) from 0 to 20 weight percent of a plasticizer; and (b) from 20 to 90 weight percent of an inorganic filler. The subject formulations are usefully applied via spray, screed, and extrusion techniques.

19 Claims, 1 Drawing Sheet

*FIG. 1*

THERMOPLASTIC MARKING COMPOSITIONS

This application is a 371 of PCT/US98/22123 filed Oct. 19, 1998 and claims benefit of Provisional 60/063129 filed Oct. 21, 1997 and also 60/071685 filed Jan. 16, 1998.

The subject invention pertains to thermoplastic marking compositions. In particular, the subject invention pertains to thermoplastic marking compositions comprising a binder, which in turn comprise at least one homogeneous polymer.

Thermoplastic marking formulations which comprise inorganic fillers bound by a polymeric binder are known in the art.

PCT Publication WO9623845 discloses a thermoplastic adhesive composition suitable for use as a road-marking, which comprises a silane-modified petroleum resin containing 0.05 to 1.0 weight percent silane functionality, extender oil and/or plasticizer, pigment and filler. The adhesive composition is said to provide improved adhesion of glass beads to road surfaces for improved endurance.

Dutch Patent Publication NL7907550 discloses reflective road markings which are laid by applying a standard hot melt road marking composition to the road surface, then applying a reflector containing a thermoplastic to the still hot marking composition. The reflector material preferably contains glass pearls, prismatic or lens reflectors, and is based on essentially the same materials as the road marking composition.

British Patent Publication GB2059430 discloses a hot melt thermoplastic road marking composition comprising 7 to 38 weight percent synthetic resin, 1 to 10 weight percent plasticizer, 0 to 10 weight percent elastomer, 1 to 15 weight percent pigments, 0 to 35 weight percent glass beads, 10 to 50 weight percent mineral aggregate, 10 to 50 weight percent extender and 0 to 5 weight percent stabilizer. The publication reports that the composition can easily be applied to roads by a screed or extrusion type applicator at 180 to 200° C. and has high durability, even when applied only 1.5 mm thick. The publication further provides that glass beads at 280 to 500 grams/square meter can be applied to the molten surface.

Japanese Patent Publication JP52058737 discloses compositions which are prepared by mixing (a) 2 to 20 parts by weight ethylene-vinyl acetate copolymer or atactic polypropylene; (b) 60 to 96 parts by weight carboxy-modified hydrocarbon resin (with an acid value of 0.1 to 25) or ester-modified hydrocarbon resin obtained by reacting the carboxy-modified resin with alcohol; (c) 2 to 20 parts by weight low molecular weight polyethylene, which is optionally carboxy-modified; and (d) 200 to 700 parts by weight mineral fillers or pigment, optionally with plasticizers or glass beads. The disclosed coatings are said to have improved flexibility, and strength, and are obtained from compositions improved fluidity.

British Patent Publication GB1324553 discloses a road marking composition of a hot-applied, thermoplastic superimposed type comprising: (a) aggregate,(for example, crushed marble, dolomite, calcite spar or silica sand), (b) pigment and extender, and (c) a binder consisting of (i) 55 to 90 weight percent of polymeric unsaturated resin, (ii) 10 to 45 weight percent of a hydrocarbon oil plasticizer, which has a flash point (open) of greater than or equal to 400 degrees F. (204° C.) and a viscosity of 6 to 10 poise at 25 degrees C., and (iii) 0 to 10 weight percent of an aliphatic monocarboxylic acid having at least fourteen carbons, such as stearic acid or oleic acid. The publication discloses the inclusion of Ballotini (glass beads) for making reflective line markings. The publication discloses the use of $TiO_2$ as the pigment with whiting as the extender, or a heat stable yellow pigment, instead of $TiO_2$.

European Patent Publication EP 115,434 describes a hot melt adhesive composition comprising a copolymer of ethylene and at least one alpha-olefin having from 3 to 10 carbon atoms and a tackifier. The copolymer has a molecular weight of 1000 to 40,000. The alpha-olefin is present in an amount of from 2 to 40 percent by weight. The copolymers of the examples are prepared using a soluble vanadium catalyst. The publication discloses the use of the adhesives in road marking applications.

Those in industry would find great advantage in a thermoplastic marking formulation which exhibits a consistent and low viscosity (as evidenced by a melt viscosity at 350° F. (177° C.) of no more than 5000 centipoise), which exhibits reduced fuming and smoking, and which exhibits good low temperature flexibility (as evidenced by an embrittlement temperature of −10 to −20° C.).

Accordingly, the subject invention provides a thermoplastic marking composition comprising:
(a) from 10 to 80 weight percent of a binder, which in turn comprises:
  (i) from 1 to 99 weight percent of at least one homogeneous polymer;
  (ii) from 5 to 70 weight percent of at least one tackifier;
  (iii) from 0 to 10 weight percent of a polyethylene which has pendant acid functionality moieties or of a non-functionalized wax; and
  (iv) from 0 to 20 weight percent of a plasticizer; and
(b) from 20 to 90 weight percent of an inorganic filler.

The subject formulations are usefully applied via spray, screed, and extrusion techniques. The subject formulations exhibit improved low temperature flexibility and low temperature adhesion and abrasion, and exhibit improved smoke and low odor properties at high temperatures. The subject formulations exhibit a broad potential range of application temperatures, particularly at temperatures of from 150° C. to 250° C., which makes them suitable for application by different means. For instance, the ability of the compositions to be applied at lower application temperatures, that is, temperatures of 150 to 170° C., makes them suitable for application by extrusion coating techniques; while the ability of the compositions to be applied at higher application temperatures, that is, temperatures of 200° C. to 250° C. makes them suitable for application by spray coating techniques. The subject formulations are preferably resistant to dirt pick-up, and further preferably exhibit less viscosity variability relative to systems which lack the homogeneous ethylene polymer.

The unique balance of properties characteristic of the formulations of the invention makes them suitable in a variety of coating, marking, and painting applications, including but not limited to road markings, traffic signs, runway markings, pedestrian crosswalks, building advertisements and markings, bicycle lanes, tennis courts, marking of tartan substitutes, stop lines, and driving course markings.

These and other embodiments are described in the following detailed description.

Test Methods Utilized for Characterizing the Homogeneous Ethylene Polymer

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968) to derive the following equation:

$$M_{polyethylene} = a * (M_{polystyrene})b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melt viscosity of polymer components is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise (0.1 to 1000 grams/(cm·second)). A cutting blade is employed to cut samples into pieces small enough to fit into the 1 inch wide, 5 inches long (2.5 cm wide, 13 cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

The adhesives of the invention comprise at least one homogeneous ethylene/α-olefin interpolymer which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), it does not additionally have a distinct lower temperature melting peak.

The homogeneous ethylene/α-olefin interpolymers useful in the invention are characterized as having a narrow molecular weight distribution ($M_w/M_n$). For the homogeneous ethylene/α-olefins useful in the practice of the invention, the $M_w/M_n$ is from 1.5 to 2.5, preferably from 1.8 to 2.2, most preferably about 2.0.

Homogeneously branched linear ethylene/α-olefin interpolymers may be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071, to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from The Dow Chemical Company as Affinity™ polyolefin plastomers. Substantially linear ethylene/α-olefin interpolymers may be prepared in accordance with the techniques described in U.S. Pat. No. 5,272,236, U.S. Pat. No. 5,278,272, and U.S. Pat. No. 5,665,800.

Especially preferred homogeneous ethylene/α-olefin polymers are ultra-low molecular weight polymers may be made in accordance with the teaching of PCT Publication WO 97/26287, which is equivalent to U.S. patent application Ser. No. 08/784,683, filed on Jan. 22, 1997.

The at least one homogeneous polymer will be an interpolymer of ethylene with at least one comonomer selected from the group consisting of $C_3$–$C_{20}$ α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include $C_4$–$C_{20}$ α-olefins, such as 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allyicyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene;

5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The molecular weight of the ethylene/α-olefin interpolymer will be selected on the basis of the desired performance attributes of the thermoplastic marking formulation. It is well known that the molecular weight of the polymer will correlate with the melt viscosity of the polymer. Typically, the ethylene/α-olefin interpolymer will have a melt viscosity at 350° F. (177° C.) of at least 500 centipoise, preferably at least 1500 centipoise (15 grams/cm·second), more preferably at least 2500 centipoise (25 grams/cm·second, and most preferably at least 3000 centipoise (30 grams/cm·second). Likewise, the ethylene/α-olefin interpolymer will typically have a melt viscosity at 350° F. (177° C.) of no more than 14,000 centipoise (140 grams/cm·second), preferably no more than 9000 centipoise (90 grams/cm·second), more preferably no more than 7500 centipoise (75 grams/cm·second), and most preferably no more than 5000 centipoise (50 grams/cm·second).

When the ethylene/α-olefin interpolymer has an ultra-low molecular weight, a number average molecular weight less than 11,000, the ethylene/α-olefin interpolymer leads to a low polymer and formulation viscosity but is characterized by a peak crystallization temperature which is greater than that of corresponding higher molecular weight materials of the same density. In pressure sensitive adhesive applications, the increase in peak crystallization temperature translates to an increased heat resistance. Ultra-low molecular weight ethylene/α-olefin interpolymers are more fully described below.

The density of the ethylene/α-olefin interpolymer will likewise be selected on the basis of the desired performance attributes of the adhesive formulation. Typically, however, the ethylene/α-olefin interpolymer will have a density of at least 0.855 g/cm$^3$, preferably at least 0.860 g/cm$^3$, and more preferably at least 0.870 g/cm$^3$. Typically, the ethylene/α-olefin interpolymer will have a density of no more than 0.965 g/cm$^3$, preferably no more than 0.920 g/cm$^3$, more preferably no more than 0.890 g/cm$^3$, and even more preferably no more than 0.880 g/cm$^3$, and most preferably no more than 0.875 g/cm$^3$.

The ethylene/α-olefin interpolymer will be present in the binder component of the thermoplastic marking composition of the invention in an amount greater than 1, preferably greater than 5, and more preferably greater than 10 weight percent. The ethylene/α-olefin interpolymer will typically be present in the binder component of the thermoplastic marking composition of the invention in an amount of not more than 99, preferably not more than 90, and more preferably not more than 80 weight percent. In especially preferred embodiments, the ethylene/α-olefin interpolymer will be present in the binder component in an amount of from 25 to 50 weight percent.

The first polymer may be suitably prepared using a single site metallocene or a constrained geometry metal complex. Constrained geometry catalysts are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat Nos. 5,470,993, 5,374,696, 5,231,106, 5,055,438, 5,057,475, 5,096,867, 5,064,802, and 5,132,380. In U.S. Ser. No. 720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts.

Suitable activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), WO 95/00683 (equivalent to U.S. Ser. No. 08/82,201), and EP-A-520,732 (equivalent to U.S. Ser. No. 07/884,966) filed May 1, 1992.

Catalysts found to be particularly suitable in the preparation of substantially linear ethylene/α-olefin interpolymers include, for instance, the catalysts described in the Examples set forth below, as activated by trispentafluorophenylborane and triisobutylaluminum modified methylalumoxane cocatalysts.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients as well as the recovered catalyst components must be protected from oxygen and moisture. Therefore, the catalyst components and catalysts must be prepared and recovered in an oxygen and moisture tree atmosphere. Preferably, therefore, the reactions are performed in the presence of a dry, inert gas such as, for example, nitrogen.

The polymerization may be carried out as a batchwise or a continuous polymerization process, with continuous polymerization processes being required for the preparation of substantially linear polymers. In a continuous process, ethylene, comonomer, and optionally solvent and diene are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres (350 MPa). The reactor temperature should be greater than 80° C., typically from 100° C. to 250° C., and preferably from 100° C. to 150° C., with temperatures at the higher end of the range, temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min., the hydrogen:ethylene molar ratio will typically be from 0.45:1 to 0.7:1. The upper limit of the hydrogen:ethylene molar ratio is from 2.2 to 2.5:1.

Generally the polymerization process is carried out with a differential pressure of ethylene of from 10 to 1000 psi (70 to 7000 kPa), most preferably from 40 to 60 psi (30 to 300 kPa). The polymerization is generally conducted at a temperature of from 80 to 250° C., preferably from 90 to 170° C., and most preferably from greater than 95° C. to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1. Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The ethylene/α-olefin interpolymer may alternatively be prepared in a gas phase polymerization process, using the catalysts as described above as supported in an inert support, such as silica. The ethylene/α-olefin interpolymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

The binder component of the thermoplastic marking composition of the invention will comprise at least 5 weight percent tackifier, typically at least 10 weight percent tackifier, and more preferably at least 20 weight percent tackifier. Likewise, the binder component of the thermoplastic marking composition of the invention will comprise no more than 70 weight percent tackifier, preferably no more than 60 weight percent tackifier, and more preferably no more than 50 weight percent tackifier.

In general terms, the tackifying resins useful in the binder components of the thermoplastic marking compositions of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the binder component of the thermoplastic marking compositions of this invention. Representative examples of useful hydrocarbon resins includes alpha-methyl styrene resins, branched and unbranched $C_5$ resins, $C_9$ resins, $C_{10}$ resins, as well as styrenic and hydrogenated modifications of such.

Tackifying resins range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the binder component of the thermoplastic marking compositions of the present invention, particularly when only a single homogeneous ethylene/α-olefin interpolymer is utilized.

For the binder component of the thermoplastic marking compositions of the invention, the preferred tackifying resin is predominantly aliphatic. However, tackifying resins with increasing aromatic character are also useful, particularly when a second tackifier or mutually compatible plasticizer is employed.

A plasticizer is broadly defined as a typically organic composition that can be added to thermoplastics, rubbers and other resins to improve extrudability, flexibility, workability, or stretchability. In preferred embodiments of the invention, the plasticizer will be provided to the binder component of the thermoplastic marking composition in amounts up to 20 weight percent, preferably less than 15 weight percent, and more preferably less than 10 weight percent, of the binder component of the thermoplastic marking composition. While the use of a plasticizer is optional, when it is utilized, it will typically be provided in the binder component in an amount of at least 1 weight percent, preferably at least 3 weight percent.

The plasticizer may be either a liquid or a solid at ambient temperature. Exemplary liquid plasticizers include hydrocarbon oils, polybutene, and liquid elastomers. Plasticizer oils are primarily hydrocarbon oils which are low in aromatic content and which are paraffinic or naphthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above 60° C. It is believed that by combining the homogeneous ethylene/α-olefin interpolymer with a suitable tackifying resin and a solid plasticizer such as a cyclohexane dimethanol dibenzoate plasticizer, the resulting thermoplastic marking composition may be applied at temperatures below 120° C., preferably below 100° C. Although a 1,4-cyclohexane dimethanol dibenzoate compound commercially available from Velsicol under the trade name Benzoflex™ 352 is exemplified, any solid plasticizer that will subsequently recrystallize in the compounded thermoplastic composition is suitable. Other plasticizers that may be suitable for this purpose are described in EP 0422 108 B1 and EP 0 410 412 B1, both assigned to H. B. Fuller Company.

Waxes may be usefully employed in the binder component of the thermoplastic marking compositions of the present invention, particularly when the thermoplastic marking composition is intended to be relatively tack free upon cooling and solidifying, such as for various packaging and bookbinding applications as well as foam in place gaskets. Waxes useful in the binder component of the thermoplastic marking compositions of the present invention include paraffin waxes, microcrystalline waxes, Fischer-Tropsch, polyethylene and by-products of polyethylene wherein $M_w$ is less than 3000. The wax is present in the binder component in an amount less than 10 percent by weight, preferably less than 8 percent by weight. While the wax is optional, when it is utilized, it will typically be provided in an amount of at least 1 weight percent, preferably at least 3 weight percent.

Also suitable are ultra-low molecular weight ethylene/α-olefin interpolymers prepared using a constrained geometry catalyst, and may be referred to as homogeneous waxes. Such homogeneous waxes, as well as processes for preparing such homogeneous waxes, are set forth in the Examples below. Homogeneous waxes, in contrast to paraffinic waxes and crystalline ethylene homopolymer or interpolymer waxes, will have a $M_w/M_n$ of from 1.5 to 2.5, preferably from 1.8 to 2.2.

Homogeneous waxes will be either ethylene homopolymers or interpolymers of ethylene and a $C_3$–$C_{20}$ α-olefin. The homogeneous wax will have a number average molecular weight less than 6000, preferably less than 5000. Such homogeneous waxes will typically have a number average molecular weight of at least 800, preferably at least 1300.

Homogeneous waxes lead to a low polymer and formulation viscosity, but are characterized by peak crystallization temperatures which are greater than the peak crystallization temperatures of corresponding higher molecular weight materials of the same density. In polymeric binding applications, the increase in peak crystallization temperature translates to an increased heat resistance, improved creep resistance, and improved shear adhesion failure temperatures.

In addition to or in place of a non-functionalized wax, the binder formulation will optionally contain a polyethylene having pendant acid functionality moieties. Any unsaturated organic compound containing at least one ethylenic unsaturation (for example, at least one double bond), at least one carbonyl group (—C═O), and that will graft to a polyethylene can be used in the practice of this invention. Representative of compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the acid-functionalized polyethylene is at least 0.01 weight percent, and preferably at least 0.05 weight percent, based on the combined weight of the polymer and the organic compound. The maximum amount of unsaturated organic compound content can vary to convenience, but typically it does not exceed 10 weight percent, preferably it does not exceed 5 weight percent, and more preferably it does not exceed 2 weight percent.

The unsaturated organic compound can be grafted to the polyethylene by any known technique, such as those taught in U.S. Pat. No. 3,236,917 and U.S. Pat. No. 5,194,509. For example, in the '917 patent the polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, for example, 210 to 300° C., and a free radical initiator is not used or is used at a reduced concentration.

An alternative and preferred method of grafting is taught in U.S. Pat. No. 4,950,541, by using a twin-screw devolatilizing extruder as the mixing apparatus. The polyethylene and unsaturated organic compound are mixed and reacted within the extruder at temperatures at which the reactants are molten and in the presence of a free radical initiator. Preferably, the unsaturated organic compound is injected into a zone maintained under pressure within the extruder.

The acid-functionalized polyethylene is present in the binder component in an amount less than 10 percent by weight, preferably less than 8 percent by weight. While the acid-functionalized polyethylene is optional, when it is utilized, it will typically be provided in an amount of at least 1 weight percent, preferably at least 3 weight percent.

Any polyethylene which may be acid-functionalized will be suitable in the practice of the invention. However, one preferred class of polyethylene is the class of ultra-low molecular weight ethyleno/α-olefin interpolymers prepared using a constrained geometry catalyst. Such polyethylene will have an $M_w/M_n$ of from 1.5 to 2.5, preferably from 1.8 to 2.2.

The polyethylene, prior to acid-functionalization, will preferably have a number average molecular weight less than 6000, preferably less than 5000; and will typically have a number average molecular weight of at least 800, preferably at least 1300, as determined by gel permeation chromatography.

As is known in the art, various other components can be added to modify the tack, color, or odor, of the thermoplastic marking composition. Additives such as antioxidants (for example, hindered phenolics (for example, Irganox™ 1010, Irganox™ 1076), phosphites (for example, Irgafos™ 168)), antiblock additives, pigments, and fillers, can also be included in the formulations. It is generally preferred that the additives should be relatively inert and have negligible effects upon the properties contributed by the homogeneous linear or substantially linear interpolymer, tackifying agent, and plasticizing oil.

In addition to the binder component, the thermoplastic marking compositions of the invention will further comprise at least one inorganic filler. Fillers which are useful in the formulations include sand (quartz), dolomite or talc, carbon black or graphite, calcium carbonate, flyash, cement dust, clay, feldspar, nepheline, silica or glass, fumed silica, alumina, magnesium oxide, zinc oxide, barium sulfate, aluminum silicate, calcium silicate, titanium dioxide, titanates, glass microspheres, chalk, and pigments. Of these fillers, sand (quartz), dolomite or talc, glass microspheres, pigments, and mixtures thereof, are preferred.

The filler will be provided to the thermoplastic marking composition in an amount of from 40 to 90 weight percent, preferably from 50 to 90 weight percent. In particularly preferred embodiments, the filler will comprise a combination of the following: 0 to 60 weight percent sand, 0 to 100 percent dolomite or talc, 0 to 50 weight percent glass microspheres, and 1 to 20 weight percent pigment.

When it is desired that the thermoplastic coating composition have reflective attributes, a reflective inorganic filler will be employed. One particularly preferred reflective inorganic filler is glass microspheres. When a reflective inorganic filler is employed, it will typically be provided to the thermoplastic coating composition in an amount of at least 5 weight percent, preferably at least 10 weight percent, and more preferably at least 20 weight percent. The reflective inorganic filler will be provided to the thermoplastic coating composition in an amount of no more than 70, preferably no more than 50 weight percent, and most preferably no more than 40 weight percent.

Certain inorganic fillers will typically be employed in an effort to reduce the cost of the formulation. One suitable extending filler is dolomite clay. When employed, the dolomite filler will be provided in an amount of at least 10 weight percent, more preferably at least 20 weight percent, and most preferably at least 30 weight percent of the thermoplastic coating composition. The dolomite filler will typically be provided in an amount of no more than 80 weight percent, more preferably no more than 75 weight percent, and most preferably no more than 70 weight percent of the thermoplastic coating composition.

The thermoplastic marking compositions of the invention are advantageous, in that they may be readily designed to be applied by the various techniques used in the industry. For instance, the subject invention has permitted the development of a single formulation, which may be usefully applied by extrusion, screed, or spray techniques.

The thermoplastic marking compositions of the invention will preferably exhibit an adhesion, as measured in accordance with the techniques set forth in Example Two, of at least 1.0 $N/mm^2$, preferably at least 1.2 $N/mm^2$, more preferably at least 1.3 $N/mm^2$, and most preferably at least 1.5 $N/mm^2$.

The thermoplastic marking compositions of the invention will preferably exhibit a luminance factor, as measured in accordance with the techniques set forth in Example Two, of at least 70, preferably at least 75, more preferably at least 76, and most preferably at least 78.

The thermoplastic marking compositions of the invention further exhibit good low temperature abrasion resistance. The subject formulations exhibit improved low temperature flexibility and low temperature adhesion, and exhibit improved smoke and low odor properties at high temperatures. The subject formulations exhibit a broad potential range of application temperatures, particularly at temperatures of from 150° C. to 250° C., which makes them suitable for application by different means. For instance, the ability of the compositions to be applied at lower application temperatures, that is, temperatures of about 150 to 170° C., makes them suitable for application by extrusion coating techniques; while the ability of the compositions to be applied at higher application temperatures, that is, temperatures of 200° C. to 250° C. makes them suitable for application by spray coating techniques. The subject formulations are preferably resistant to dirt pick-up, and further preferably exhibit less viscosity variability relative to systems which lack the homogeneous ethylene polymer.

The subject formulations are usefully applied via spray, screed, and extrusion techniques. In addition, the subject formulations may be provided as preformed tapes, which are laid upon the surface and bonded to it by heating with, for example, a gas flame, optionally under some applied pressure, as by rolling.

Exemplary applications for the thermoplastic marking compositions of the invention are in hot melt extrusion road marking; hot melt spray road marking; hot melt hand applied road markings; colored hot melt marked bicycle lanes applied by spray or extrusion; marking of simulation/training roads for icy surface driving; preformed extruded traffic symbols (such as arrows, letters, etc.) and tapes (such as for traffic safety, information, decoration, etc.) (also called premarks or hot melt tapes); marking of flexible and soft sports/playground surfaces, such as tartan (for instance, in the marking of tennis courts, outdoor and indoor sports floorings, etc.); safety markings on ships, oil rigs, etc.; and reflecting traffic safety coatings for tunnels, concrete, metals with glass beads or other reflecting/self-glowing pigments.

In one preferred application, the subject thermoplastic marking compositions will be employed in embossed road markings. Embossed road markings are formed by extrusion of a marking composition onto a surface; applying reflective particles, such as glass beads, to the extruded marking; and embossing the extruded marking such as to create channels or other ridges. Such embossed markings are desirable, in that they provide enhanced water drainage and improve nighttime reflective properties, particularly in rainy weather. The thermoplastic marking compositions of the invention are advantageous in embossed road marking applications, as they provide the requisite degree of flexibility, adhesion, and abrasion, even under cold temperature conditions.

The following examples are provided to illustrate typical embodiments of the invention, and are not intended to serve as limits as to its scope.

Preparation of Homogeneous Ethylene Polymers

The homogeneous ethylene polymers are prepared in accordance with the procedure of PCT Publication WO 97/26287, which is equivalent to U.S. patent application Ser. No. 08/784,683, filed on Jan. 22, 1997.

The procedure for the preparation of Polymer A is set forth as follows:

The procedure for preparing the ultra-low molecular weight ethylene polymers is as follows.

Catalyst Preparation

Part 1: Preparation of $TiCl_3(DME)_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of $TiCl_3$ was weighed into an equalizing powder addition funnel; the funnel was capped, removed from the drybox, and put on the reaction kettle in place of the stopper. The $TiCl_3$ was added over about 10 minutes with stirring. After the addition was completed, additional DME was used to wash the rest of the $TiCl_3$ into the flask. The addition funnel was replaced with a stopper, and the mixture heated to reflux. The color changed from purple to pale blue. The mixture was heated for about 5 hours, cooled to room temperature, the solid was allowed to settle, and the supematant was decanted from the solid. The $TiCl_3(DME)_{1.5}$ was left in R-1 as a pale blue solid.

Part 2: Preparation of $[(Me_4C_5)SiMe_2N\text{-}t\text{-}Bu][MgCl]_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of $(Me_4C_5H)SiMe_2NH\text{-}t\text{-}Bu$, and 3.46 kg of 2 M i-PrMgCl in $Et_2O$. The mixture was then heated, and the ether allowed to boil off into a trap cooled to −78°

C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of [($\eta^5$-Me$_4$C$_5$)SiMe$_2$N-t-Bu]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color, and the temperature in R-2 rose from 21° C. to 32° C. After 20 minutes, 160 mL of CH$_2$Cl$_2$ was added through a dropping funnel, resulting in a color change to green/brown. This was followed by the addition of 3.46 kg of 3 M MeMgCl in THF, which caused a temperature increase from 22° C. to 5° C. The mixture was stirred for 30 minutes, then 6 L of solvent was removed under vacuum. Isopar™ E hydrocarbon (6 L) was added to the flask. This vacuum/solvent addition cycle was repeated, with 4 L of solvent removed and 5 L of Isopar™ E hydrocarbon added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [($\eta^5$-Me$_4$C$_5$)SiMe$_2$N-t-Bu]TiMe$_2$. The remaining solids in R-2 were further extracted with Isopar™ E hydrocarbon, the solution was transferred to R-3, then dried under vacuum and re-extracted with Isopar™ E hydrocarbon. This solution was transferred to storage bottles; analysis indicated a concentration of 0.1403 M titanium and a volume of 4.3 L (0.6032 moles [($\eta^5$-Me$_4$C$_5$)SiMe$_2$N-t-Bu]TiMe$_2$). This gives an overall yield of 3.2469 moles of [($\eta^5$-Me$_4$C$_5$)SiMe$_2$N-t-Bu]TiMe$_2$, or 1063 g. This is a 72 percent yield overall based on the titanium added as TiCl$_3$.

Polymerization

Polymer A was prepared in accordance with the following procedure and utilizing the reaction conditions set forth in Table One.

The ethylene and the hydrogen were combined into one stream before being introduced into the diluent mixture, a mixture of C$_8$–C$_{10}$ saturated hydrocarbons, for example, ISOPAR-E hydrocarbon mixture (available from Exxon Chemical Company) and the comonomer. The comonomer was 1-octene. The reactor feed mixture was continuously injected into the reactor.

The metal complex and cocatalysts were combined into a single stream and were also continuously injected into the reactor. The cocatalyst was tris(pentafluorophenyl)borane, available as a 3 weight percent solution in Isopar™-E mixed hydrocarbon, from Boulder Scientific. Aluminum was provided in the form of a solution of modified methylalumoxane (MMAO Type 3A) in heptane, which is available at a 2 weight percent aluminum concentration from Akzo Nobel Chemical Inc.

Sufficient residence time was allowed for the metal complex and cocatalyst to react prior to introduction into the polymerization reactor. In each polymerization reaction, the reactor pressure was held constant at about 475 psig (3.3 MPa). Ethylene content of the reactor, in each polymerization, after reaching steady state, was maintained at the conditions specified in Table One.

After polymerization, the reactor exit stream was introduced into a separator where the molten polymer is separated from the unreacted comonomer(s), unreacted ethylene, unreacted hydrogen, and diluent mixture stream. The molten polymer was subsequently strand chopped or pelletized, and, after being cooled in a water bath or pelletizer, the solid pellets were collected. Table One describes the polymerization conditions and the resultant polymer properties of Polymer A.

Polymer A was stabilized with 2000 ppm Irganox™ 1010 hindered phenolic, available from Ciba-Geigy.

TABLE One

| | Polymer A |
|---|---|
| Total Ethylene feed (lb/hr (kg/hr)) | 2.0(0.91) |
| Fresh Ethylene feed (lb/hr (kg/hr)) | 2.0(0.91) |
| Total comonomer feed (lb/hr (kg/hr)) | 2.3(1.04) |
| Fresh comonomer feed (lb/hr (kg/hr)) | 2.3(1.04) |
| Comonomer: olefin ratio (mole percent) | 12.5 |
| Hydrogen: ethylene ratio (mole percent) | 0.49 |
| Diluent ethylene ratio (weight basis) | 11.1 |
| Catalyst metal concentration (ppm) | 4 |
| Catalyst flow rate (lb/hr (kg/hr)) | 0.32(0.14) |
| Co-catalyst concentration (ppm) | 88 |
| Co-catalyst flow rate (lb/hr (kg/hr)) | 0.46 (0.21) |
| Aluminum concentration (ppm) | 9.8 |
| Aluminum flow rate (lb/hr (kg/hr)) | 0.44(0.20) |
| Reactor temperature (° C.) | 110 |
| Ethylene concentration in reactor exit stream (weight percent) | 1.69 |
| Polymer density (g/cm$^3$) | 0.873 |
| Polymer melt viscosity at 350° F. (177° C.) (centipoise (grams/(cm . second)) | 4300 (43) |

EXAMPLE ONE

The following components are heated to 180° C. in a standard mixer and are blended at low speed to avoid introducing air bubbles into the melt in the amounts indicated in Table One (A). Polymer A is a substantially linear ethylene/1-octene copolymer having a density of 0.873 g/cm$^3$ and a melt viscosity of 4300 centipoise (43 grams/cm·second) at 177° C., available from The Dow Chemical Company. The tackifier is Escorez 1102-M C$_5$ resin, available from Exxon Chemical Company, and having a density of 0.970 g/cm$^3$ and a viscosity of 7500 centipoise (75 grams/cm·second) at 140° C. The mineral oil is Midicway 68, available from Statoil, and having a density of 0.870 g/cm$^3$ and a viscosity of 71 centistokes at 40° C. The wax is Polyace 573 maleic-anhydride grafted wax, available from Allied Signal, and having a maximum viscosity of 600 centipoise (6 grams/cm·second) at 140° C., a hardness of 3 to 6 dmm at 25° C., a Mettler drop point of 104 to 107° C., and no more than 0.06 percent free maleic anhydride. TiO$_2$, rutile, A-11; and TiO$_2$, anatase R-011, are available from Kronos Titan A/S. Dolomite is provided as Microdol M-200, made by Micro Minerals, and is available from Norwegian Talc AS. Sand is provided as sodium-feldspar. Glass reflecting beads are available from Swarco Vestglas, as Class A-OV beads.

TABLE One (A)

| Component | Amount (weight percent) |
|---|---|
| Tackifier | 10 |
| Polymer A | 8 |
| Mineral Oil | 2.5 |
| Wax | 1 |
| $TiO_2$, rutile | 1.7 |
| $TiO_2$, anatase | 1.7 |
| Dolomite | 30.1 |
| Sand | 25 |
| Glass beads | 20 |

EXAMPLE TWO

Spray Thermoplastic Marking Compositions

The following compositions are prepared in the manner set forth above with respect to Example One. Polymer B, available from The Dow Chemical Company, is a substantially linear ethylene/1-octene copolymer having a melt viscosity at 350° F. (177° C.) of 2700 centipoise (27 grams/cm·second) and a density of 0.892 g/cm$^3$.

The thermoplastic marking compositions are evaluated for viscosity, needle penetration, luminance factor, color, and adhesion.

Viscosity is measured using standard techniques, for instance, using a Brookfield Viscometer model DV-1+ type RVT at 200° C. with spindle No. 28 at 20 rpm or a Viscotech rheometer, with viscosity measurements being performed at 200° C. and using a P 20 ETC spindle.

Needle penetration is measured in accordance with Test Method prEN 1871 Annex J, Thermoplastic—Method for testing indentation.

Figure 1:
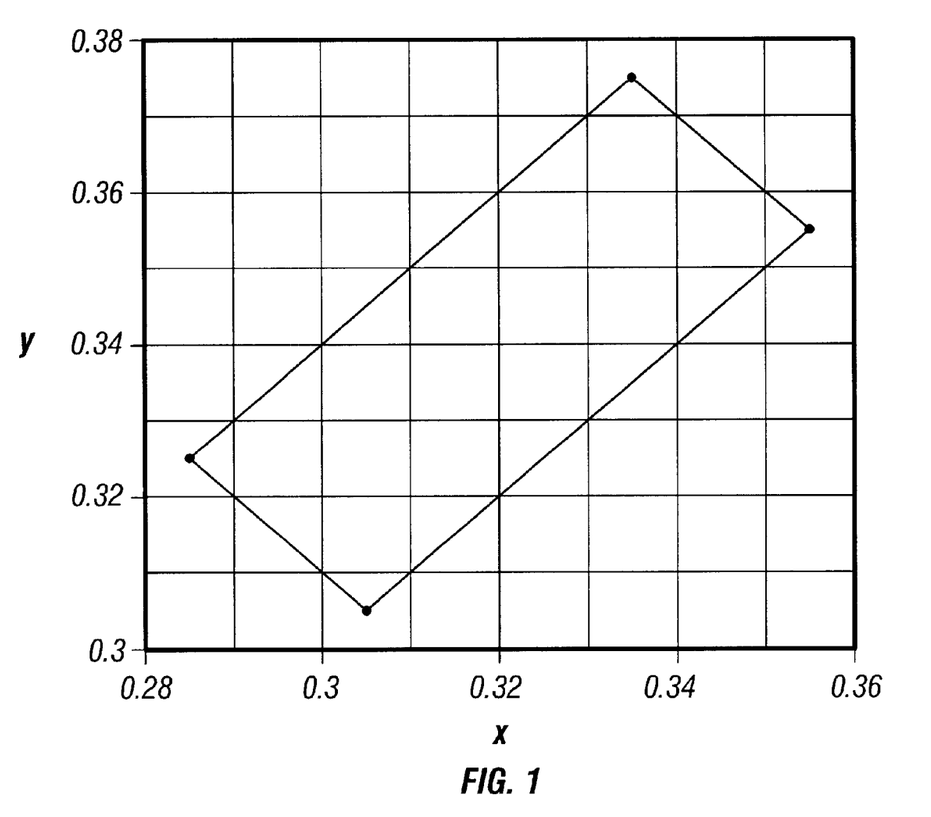

Luminance factor and color coordinates are measured in accordance with Test Method prEN 1871, Annex E, Thermoplastic—Method for testing trichromatic coordinates x, y and luminance factor β. Color coordinates will preferably fall within the shape defined in FIG. 1.

Adhesion is measured in accordance with Test Method VVMB 502:1993—Thermoplastic road marking materials, determination of a tensile bond, except that the test is performed on concrete, instead of Marshall test specimens.

The observed properties are set forth in the following Table Two:

TABLE Two

| | Target | Sample 1 | Sample 2 |
|---|---|---|---|
| Viscosity at 200° C. (centipoise (grams/cm . second)) | 3000–5000 (30–50) | 4350 (43.5) | 5175 (51.75) |
| Needle Penetration (s/10 mm) | 5–120 | 34.5 | 62 |
| Luminance Factor | 76 ± 1 | 77.5 | 78.7 |
| Color coordinates (x/y) | Figure 1 | 0.324/0.344 | 0.325/0.343 |
| Adhesion (N/mm$^2$) | greater than 1.3 | 1.42 | 0.99 |

As set forth in Table Two, the formulation of Sample 1 satisfies each of the targeted criteria, making it a preferred relative to the formulation of Sample 2.

EXAMPLE THREE

Extrusion Thermoplastic Marking Compositions

The following compositions are prepared in the manner set forth above with respect to Example One. Polymer B, available from The Dow Chemical Company, is a substantially linear ethylene/1-octene copolymer having a melt viscosity at 350° F. (177° C.) of 2700 centipoise (27 grams/cm·second) and a density of 0.892 g/cm$^3$.

The thermoplastic marking compositions are evaluated for viscosity, needle penetration, luminance-factor, color, and adhesion in accordance with the procedures set forth with respect to Example Two.

The observed properties are set forth in the following Table Three:

TABLE Three

| | Target | Sample 1 | Sample 2 |
|---|---|---|---|
| Viscosity at 200° C. (centipoise (grams/cm . second)) | 6000–9000 (60–90) | 4850 (48.5) | 6450 (64.5) |
| Needle Penetration (s/10 mm) | 5–45 | 33 | 55 |
| Luminance Factor | 76 ± 1 | 78.4 | 78.6 |
| Color coordinates (x/y) | Figure 2 | 0.324/0.343 | 0.324/0.343 |
| Adhesion (N/mm$^2$) | greater than 1.3 | 1.42 | 0.99 |

EXAMPLE FOUR

The following compositions are prepared in the manner set forth above with respect to Example One.

The polymers utilized in the binder formulations are as set forth in the following Table Four, wherein each is a substantially linear ethylene/1-octene copolymer, available from The Dow Chemical Company:

TABLE Four

| | Density (g/cm$^3$) | Melt viscosity at 350° F. (177° C.) (centipoise (grams/cm . second)) |
|---|---|---|
| Polymer A | 0.873 | 4300 (43) |
| Polymer B | 0.892 | 2700 (27) |
| Polymer C (comparative) | 0.870 | 1000* (10) |
| Polymer D | 0.880 | 5000 (50) |
| Polymer E (comparative) | 0.880 | 1000* (10) |
| Polymer F | 0.890 | 1000 (10) |

*The reported values are melt indices ($I_2$), in units of g/10 minutes, as opposed to melt viscosities.

The thermoplastic marking compositions are evaluated for viscosity, needle penetration, luminance factor, color, and adhesion in accordance with the procedures set forth with respect to Example Two.

The observed properties are set forth in the following Table Five:

TABLE Five

| | Viscosity at 200° C. (centipoise (grams/cm . second)) | Needle penetration (s/10 mm) | Luminance Factor | Color coordinates (x/y) | Adhesion (N/mm$^2$) |
|---|---|---|---|---|---|
| Target | 4000–6000 (40–60) | 5–45 | 76 ± 1 | | less than 1.3 |
| Sample 6 (Polymer B) | 5350 (53.5) | 56 | 78.1 | 0.323/0.341 | 1.71 |

TABLE Five-continued

| | Viscosity at 200° C. (centipoise (grams/cm . second)) | Needle penetration (s/ 10 mm) | Luminance Factor | Color coordinates (x/y) | Adhesion (N/ mm$^2$) |
|---|---|---|---|---|---|
| Sample 7 (Comparative) (Polymer C) | 10770 (107.7) | 0 | 77.8 | 0.324/0.343 | 0.83 |
| Sample 8 (Polymer A) | 7350 (73.5) | 0 | 77.7 | 0.324/0.343 | 0.84 |
| Sample 9 (Polymer D) | 7275 (727.5) | 5.5 | 77.6 | 0.324/0.343 | 0.93 |
| Sample 10 (Comparative) (Polymer E) | 10050 (100.5) | 6 | 77.4 | 0.326/0.344 | 0.88 |
| Sample 11 (Polymer F) | 4025 (40.25) | 48.5 | 78.0 | 0.325/0.344 | 1.26 |

EXAMPLE FIVE

In a preferred embodiment of the invention, the thermoplastic marking composition will satisfy the specifications set forth in the following Table Six:

TABLE Six

| | Product | | | |
|---|---|---|---|---|
| Specifications | All-around | Spray plastic | Profiled | Alt. Plast. |
| Viscosity at 200° C. (centipoise(grams/ cm . second)) | 4000– 7000 (40–70) | 2000– 5000 (20–50) | 10000– 14000 (100–140) | 4000– 9000 (40–90) |
| Needle penetration(s/10 mm) | 5–120 | 5–120 | >60* | 5–120 |
| Luminance Factor | >75 | | | |
| Color coordinates (x,y) | diagram 1 | | | |
| Adhesion (N/mm$^2$) | >1,3 | | | |

The formulation identified as "all-around" is designed to be suitable for application by extrusion, screed, or spray techniques. The formulation identified as "spray plastic" is designed to exhibit preferred performance in spray applications. The formulation identified as "profiled" is designed to exhibit preferred performance in extrusion applications. The formulation identified as "alt. plast." is similar to the "all-around" formulation, excepting that an alternate plasticizer is employed.

The formulations were prepared in the manner set forth above with respect to Example One. All testing was conducted using the measurement techniques set forth above with respect to Example Two. The formulations are set forth in the following Tables Seven through Ten. The data measured on the formulations are set forth in Table Eleven.

TABLE Seven

All Around

| Supplier | Tradename | Component | Weight % |
|---|---|---|---|
| The Dow Chemical Co. | | Polymer A, as described above | 8.00 |
| Exxon Chemical | Escorez 1102-RM | C$_5$ resin | 10.50 |
| Esso (Exxon Chemical) | Primol 542 | Paraffinic Oil | 2.50 |
| Allied Signal | Polyace 573 | Wax | 1.00 |

TABLE Seven-continued

All Around

| Supplier | Tradename | Component | Weight % |
|---|---|---|---|
| Zaklady Chemicane "Police" S.A. (Poland) | Tytanpol R001 | Titanium dioxide rutile | 6.00 |
| Norwegian Talc | Microdol M-200 | Dolomite 1 | 15.00 |
| Strabruken AB | A-40 | Dolomite 2 | 27.00 |
| Swarco Vestglas | 300–800 mm | Intermix glass beads | 30.00 |
| Total formulation | | | 100.00 |

TABLE Eight

Spray Plastic

| Supplier | Tradename | Component | Weight % |
|---|---|---|---|
| The Dow Chemical Co. | | Polymer A | 9.50 |
| Exxon Chemical | Escorez 1102-RM | C$_5$ resin | 11.50 |
| Esso (Exxon Chemical) | Primol 542 | Paraffinic Oil | 3.00 |
| Allied Signal | Polyace 573 | Wax 1 | 1.00 |
| Hüls | Vestowax C-80 | Wax 2 | 1.00 |
| Zaklady Chemicane "Police" S.A. (Poland) | Tytanpol R001 | Titanium dioxide rutile | 5.00 |
| Norwegian Talc | Microdol M-200 | Dolomite 1 | 10.00 |
| Strabruken AB | A-40 | Dolomite 2 | 59.00 |
| Total formulation | | | 100.00 |

TABLE Nine

Extrusion for profiled lines

| Supplier | Tradename | Component | Weight % |
|---|---|---|---|
| The Dow Chemical Co. | | Polymer A, as | 8.00 |
| Exxon Chemical | Escorez 1102-RM | C$_5$ resin | 8.00 |
| Esso (Exxon Chemical) | Primol 542 | Paraffinic Oil | 2.50 |
| Allied Signal | Polyace 573 | Wax 1 | 0.50 |
| Hüls | Vestowax C-80 | Wax 2 | 1.00 |
| Miljstek | Finsikt | Glass fiber | 1.00 |
| Zaklady Chemicane "Police" S.A. (Poland) | Tytanpol R001 | Titanium dioxide rutile | 6.00 |
| Kronos Titan | Kronos 1002 | Titanium dioxide anatase | 3.70 |
| Norwegian Talc | Microdol M-200 | Dolomite 1 | 15.00 |
| Strabruken AB | A-40 | Dolomite 2 | 24.30 |
| Swarco Vestglas | 300–800 mm | Intermix glass beads | 30.00 |
| Total formulation | | | 100.00 |

TABLE Ten

All-Around with Alternate Plasticizer

| Supplier | Tradename | Component | Weight % |
|---|---|---|---|
| The Dow Chemical Co. | | Polymer A | 8.50 |
| Exxon Chemical | Escorez 1102-RM | C$_5$ resin | 8.50 |
| BP Chemicals Ltd. | Hyvis 30 | Polybutene | 4.00 |
| Hüls | Vestowax C-80 | Wax | 1.00 |

TABLE Ten-continued

All-Around with Alternate Plasticizer

| Supplier | Tradename | Component | Weight % |
|---|---|---|---|
| Zaklady Chemicane "Police" S.A. (Poland) | Tytanpol R001 | Titanium dioxide rutile | 5.00 |
| Norwegian Talc | Microdol M-200 | Dolomite 1 | 15.00 |
| Strabruken AB | A-40 | Dolomite 2 | 28.00 |
| Swarco Vestglas | 300–800 mm | Intermix glass beads | 30.00 |
| Total formulation | | | 100.00 |

TABLE Eleven

Performance of the Thermoplastic Coating Compositions

| | Product | | | |
|---|---|---|---|---|
| Specifications | All-round | Spray plastic | Profiled | Alt. Plast. |
| Viscosity at 200° C. (centipoise (grams/cm . second | 6275 (62.75) | 4525 (45.25) | 12400 (124) | 7475 (74.75) |
| Needle penetration (s/10 mm | 74 | 94 | 6 | 53 |
| Luminance Factor | 84.5 | 83.8 | 80.8 | 78.9 |
| Colour coordinates (x,y) | 0.322/0.342 | 0.323/0.343 | 0.324/0.343 | 0.324/0.343 |
| Adhesion (N/mm$^2$) | 1.7 | 2.0 | * | 1.1** |

*No results because the epoxy has not cured
**The material broke; it did not loosen from the surface The subject invention has been described above, and has been exemplified in the Examples. Various modifications within the spirit and scope of the invention will be apparent to one skilled in the art. Accordingly, the scope of the invention shall be limited only by the following claims.

What is claimed is:

1. A thermoplastic marking composition comprising:
   (a) from 10 to 80 weight percent of a binder, which in turn comprises:
      (i) from 1 to 99 weight percent, based on binder, of at least one homogeneous polymer produced by a single site catalyst system;
      (ii) from 5 to 70 weight percent, based on binder, of at least one tackifier; and
   (b) from 20 to 90 weight percent of an inorganic filler wherein the thermoplastic marking composition has a luminance factor of at least 70 as measured by prEN 1871, Annex E.

2. The thermoplastic marking composition of claim 1, wherein the at least one homogeneous polymer is an ethylene/α-olefin interpolymer having a density of from 0.855 to 0.920 g/cm$^3$.

3. The thermoplastic marking composition of claim 1, wherein the at least one homogeneous polymer is an ethylene/α-olefin interpolymer having a melt viscosity at 350° F. (177° C.) of from 500 to 9000 centipoise (5 to 90 grams/cm·second).

4. The thermoplastic marking composition of claim 1, 2, or 3, wherein the at least one homogeneous polymer is an interpolymer of ethylene and at least one $C_3$–$C_{20}$ α-olefin.

5. The thermoplastic marking of claim 1, 2, or 3, wherein the at least one tackifier is selected from the group consisting of rosin derivatives, rosin esters, natural and synthetic terpenes, aliphatic-based tackifiers, aromatic-based tackifiers, mixed aliphatic-aromatic petroleum based tackifiers, and mixtures thereof.

6. The thermoplastic marking composition of claim 1, 2, or 3, wherein the inorganic filler further comprises: from 0 to 60 weight percent sand, from 0 to 100 percent dolomite or talc, from 0 to 50 weight percent glass microspheres, and from 1 to 20 weight percent pigment.

7. The thermoplastic marking composition of any of the preceding claims, which is characterized as having a melt viscosity at 350° F. (177° C.) of from 4000 to 7000 centipoise (40 to 70 grams/cm·second), a needle penetration of from 5 to 120 s/10 mm, a luminance factor of at least 75, and an adhesion of at least 1.3 N/mm$^2$.

8. The thermoplastic marking composition of any of the preceding claims, which is characterized as having a melt viscosity at 350° F. (177° C.) of from 2000 to 5000 centipoise (20 to 50 grams/cm·second), a needle penetration of from 5 to 120 s/10 mm, a luminance factor of at least 75, and an adhesion of at least 1.3 N/mm$^2$.

9. The thermoplastic marking composition of any of the preceding claims, which is characterized as having a melt viscosity at 350° F. (177° C.) of from 10,000 to 14,000 centipoise (100 to 140 grams/cm·second), a needle penetration of at least 60 s/10 mm, a luminance factor of at least 75, and an adhesion of at least 1.3 N/mm$^2$.

10. The thermoplastic marking composition of any of the preceding claims, which is characterized as having a melt viscosity at 350° F. (177° C.) of from 4000 to 9000 centipoise (40 to 90 grams/cm·second), a needle penetration of from 5 to 120 s/10 mm, a luminance factor of at least 75, and an adhesion of at least 1.3 N/mm$^2$.

11. The thermoplastic marking composition of claim 1, 2, or 3, in the form of a hot melt extrusion road marking, hot melt spray road marking, hot melt hand applied road marking, colored hot melt marked bicycle lane, simulation or training road marking, preformed extruded traffic symbol or tape, flexible and soft sports/playground surface marking, safety marking on a ship, or a reflective traffic safety coating.

12. The thermoplastic marking composition of claim 1, 2, or 3, in the form of an embossed reflective extruded marking.

13. The thermoplastic marking composition of claim 1, 2, or 3, wherein the binder further comprises (iii) at least 1 but less than 10 weight percent of a polyethylene which has pendant acid functionality moieties or is a non-functionalized wax.

14. The thermoplastic marking composition of claim 13, wherein component (iii) is a maleic anhydride grafted polyethylene, which is provided to the binder (a) in an amount of from 1 to 8 weight percent.

15. The thermoplastic marking composition of claim 1, 2, or 3, wherein the binder further comprises (iv) at least 1 but up to 20 weight percent of a plasticizer.

16. The thermoplastic marking of claim 15, wherein component (iv) is selected from the group consisting of hydrocarbon oils, polybutene, elastomers, and solid plasticizing agents having a softening point above 60° C., and is provided in an amount of from 1 to 15 weight percent.

17. A method of marking a road, comprising:
   applying a thermoplastic marking composition to a road surface, the thermoplastic marking composition having a luminance factor of at least 70 as measured by prEN 1871, Annex E and comprising from 10 to 80 weight percent of a binder and from 20 to 90 weight percent of an inorganic filler, wherein the binder comprises (i) from 1 to 99 weight percent, based on binder, of at least one homogeneous polymer produced by a single site catalyst system; and (ii) from 5 to 70 weight percent, based on binder, of at least one tackifier.

18. The method of claim 17, wherein the binder further comprises (iii) at least 1 but less than 10 weight percent of a polyethylene which has pendant acid functionality moieties or is a non-functionalized wax.

19. The method of claim 17, wherein the binder further comprises (iv) at least 1 but up to 20 weight percent of a plasticizer.

* * * * *